(12) United States Patent
Shreve et al.

(10) Patent No.: US 9,390,329 B2
(45) Date of Patent: Jul. 12, 2016

(54) METHOD AND SYSTEM FOR AUTOMATICALLY LOCATING STATIC OCCLUSIONS

(71) Applicant: Xerox Corporation, Norwalk, CT (US)

(72) Inventors: Matthew Adam Shreve, Tampa, FL (US); Edgar A Bernal, Webster, NY (US); Qun Li, Webster, NY (US); Robert P. Loce, Webster, NY (US)

(73) Assignee: Xerox Corporation, Norwalk, CT (US)

( * ) Notice: Subject to any disclaimer, the term of this patent is extended or adjusted under 35 U.S.C. 154(b) by 111 days.

(21) Appl. No.: 14/262,456

(22) Filed: Apr. 25, 2014

(65) Prior Publication Data

US 2015/0310274 A1    Oct. 29, 2015

(51) Int. Cl.
| | |
|---|---|
| *G06K 9/00* | (2006.01) |
| *G06K 9/46* | (2006.01) |
| *G06K 9/52* | (2006.01) |
| *G06T 7/20* | (2006.01) |

(52) U.S. Cl.
CPC ............. *G06K 9/00624* (2013.01); *G06K 9/46* (2013.01); *G06K 9/52* (2013.01); *G06T 7/20* (2013.01); *G06K 2009/4666* (2013.01)

(58) Field of Classification Search
CPC .................. G06K 2009/4666; G06K 9/00624; G06K 9/46; G06K 9/52; G06T 7/20
USPC ........................................................ 382/103
See application file for complete search history.

(56) References Cited

U.S. PATENT DOCUMENTS

| | | | | |
|---|---|---|---|---|
| 8,538,082 | B2 * | 9/2013 | Zhao ................... | G06K 9/00785 382/103 |
| 2006/0182312 | A1 * | 8/2006 | Nakai ................... | G06T 7/0022 382/103 |
| 2009/0002489 | A1 | 1/2009 | Yang et al. | |
| 2009/0087024 | A1 * | 4/2009 | Eaton ................. | G06K 9/00335 382/103 |
| 2011/0116684 | A1 * | 5/2011 | Coffman ................. | G06T 7/208 382/103 |
| 2011/0123067 | A1 * | 5/2011 | Podilchuk ............ | G06K 9/3241 382/103 |
| 2013/0058523 | A1 | 3/2013 | Wu et al. | |
| 2013/0076913 | A1 | 3/2013 | Xu et al. | |
| 2013/0088600 | A1 | 4/2013 | Wu et al. | |
| 2013/0106595 | A1 | 5/2013 | Loce et al. | |
| 2013/0278767 | A1 | 10/2013 | Bernal et al. | |
| 2014/0063263 | A1 | 3/2014 | Bernal et al. | |

OTHER PUBLICATIONS

U.S. Appl. No. 14/195,036, filed Mar. 3, 2014, Li et al.
U.S. Appl. No. 14/171,022, filed Feb. 3, 2014, Schweid et al.
U.S. Appl. No. 14/091,748, filed Nov. 27, 2013, Herloski et al.
U.S. Appl. No. 14/089,887, filed Nov. 26, 2013, Bernal et al.
U.S. Appl. No. 14/078,765, filed Nov. 13, 2013, Bernal et al.
U.S. Appl. No. 14/053,664, filed Oct. 15, 2013, Stojanovski et al.
U.S. Appl. No. 14/050,041, filed Oct. 9, 2013, Bernal et al.
U.S. Appl. No. 14/017,360, filed Sep. 4, 2013, Bernal et al.

(Continued)

*Primary Examiner* — Tom Y Lu
(74) *Attorney, Agent, or Firm* — Fay Sharpe LLP

(57) ABSTRACT

This disclosure provides a method and system to locate/detect static occlusions associated with an image captured scene including a tracked object. According to an exemplary method, static occlusions are automatically located by monitoring the motion of single or multiple objects in a scene over time and with the use of an associated accumulator array.

25 Claims, 6 Drawing Sheets

(56) References Cited

OTHER PUBLICATIONS

Azari, M.; Seyfi, A.; Rezaie, A.H., "Real Time Multiple Object Tracking and Occlusion Reasoning Using Adaptive Kalman Filters", Machine Vision and Image Processing (MVIP), 2011, 7th Iranian, pp. 1-5, Nov. 16-17, 2011.
Jiyan Pan; Bo Hu, "Robust Occlusion Handling in Object Tracking", Computer Vision and Pattern Recognition, 2007, CVPR '07, IEEE Conference, pp. 1-8, Jun. 17-22, 2007.
Gwo-Cheng Chao; Shyh-Kang Jeng; Shung-Shing Lee, "An improved occlusion handling for appearance-based tracking", Image Processing (ICIP), 2011 18th IEEE International Conference, pp. 465-468, Sep. 11-14, 2011.
Steven W. Smith, Ph.D., "Special Imaging Techniques", The Scientist and Engineer's Guide to Digital Signal Processing, chapter 25, pp. 423-450, copyright 1997-2011 by California Technical Publishing.
"Kalman filter", Wikipedia, http://en.wikipedia.org/wiki/Kalman_filter, 26 pages, printed Mar. 7, 2014.

U. Castellani, S. Livatino, and R. Fisher, "Improving environment modelling by edge occlusion surface completion," International Symposium on 3D Data Processing Visualization and Transmission, 2002.
C. L. Zitnick and T. Kanade, "A cooperative algorithm for stereo matching and occlusion detection," Proc. IEEE Trans. Pattern Analysis and Machine Intelligence, vol. 22, 2000.
L'Evesque and F. Deschênes, "Detection of Occlusion Edges from the Derivatives of Weather Degraded Images," Proc. of the Second Canadian Conference on Computer and Robot Vision, pp. 114-120, 2005.
J. Konrad and M. Ristivojevi. "Video segmentation and occlusion detection over multiple frames," IS&T/SPIE Symposium on Electronic Imaging, Image and Video Communications, 2003.
Jackson, B.; Bodor, R.; Papanikolopoulos, N., "Learning static occlusions from interactions with moving figures," Intelligent Robots and Systems, 2004. (IROS 2004). Proceedings. 2004 IEEE/RSJ International Conference, pp. 963,968 vol. 1, Sep. 28-Oct. 2, 2004.
Miller, G.; Atev, S.; Papanikolopoulos, N., "Detecting static occlusion edges using foreground patterns," Control and Automation, 2009. MED '09. 17th Mediterranean Conference, pp. 952,957, Jun. 24-26, 2009.

* cited by examiner

METHOD AND SYSTEM FOR AUTOMATICALLY LOCATING STATIC OCCLUSIONS

CROSS REFERENCE TO RELATED PATENTS AND APPLICATIONS

U.S. Publication No. 2015/0310273, filed Apr. 25, 2014, by Matthew Shreve et al., and entitled "STATIC OCCLUSION HANDLING USING DIRECTIONAL PIXEL REPLICATION IN REGULARIZED MOTION ENVIRONMENTS" is incorporated herein by reference in its entirety.

BACKGROUND

This disclosure provides a method and system to locate/detect pixels corresponding to static occlusions associated with an image captured scene including a tracked object. According to an exemplary method, pixels corresponding to static occlusions are automatically located by monitoring the motion of single or multiple objects in a scene over time and with the use of an associated accumulator array.

Video-based object tracking is important in computer vision applications, with applications in a wide variety of fields including surveillance and traffic monitoring, video-based vehicle speed estimation, automated parking monitoring, and measuring total experience time in retail spaces.

Static occlusions cause many failures in surveillance applications such as person and vehicle tracking. Knowledge of the locations and appearance of static occluders in a scene can be used by tracking algorithms to reduce object tracking failures. In most tracking algorithms, a track is defined for an object and the object position is updated on a frame-by-frame basis by matching known features and/or blob characteristics of the tracked object as it traverses an area of interest. Object tracking is typically performed by finding the location of the image region showcasing features that best match a current feature representation of the object being tracked. This is usually performed via search/optimization algorithms across regions of interest (ROI) in subsequent frames nearby the location of the object in the current frame. When these features and blobs are occluded by static objects, the object track can be lost since the appearance of the occluded object generally does not match the appearance of the unoccluded object. However, if the tracking algorithm has knowledge of occlusion location and shape within an image of a scene, steps can be taken to mitigate the effect of such obstacles. The present disclosure describes a completely automated method and system for automatically determining the location and appearance of static occlusions in a scene.

INCORPORATION BY REFERENCE

U.S. patent application Ser. No. 14/195,036, filed Mar. 3, 2014, by Li et al., and entitled "Method and Apparatus for Processing Image of Scene of Interest";

U.S. patent application Ser. No. 14/171,022, filed Feb. 3, 2014, by Schweid et al., and entitled "Vehicle Detection Method and System Including Irrelevant Window Elimination and/or Window Score Degradation";

U.S. patent application Ser. No. 14/089,887, filed Nov. 26, 2013, by Bernal et al., and entitled "Method and System for Video-Based Vehicle Tracking Adaptable to Traffic Conditions";

U.S. patent application Ser. No. 14/078,765, filed Nov. 13, 2013, by Bernal et al., and entitled "System and Method for Using Apparent Size and Orientation of an Object to improve Video-Based Tracking in Regularized Environments";

U.S. patent application Ser. No. 14/068,503, filed Oct. 31, 2013, by Bulan et al., and entitled "Bus Lane Infraction Detection Method and System";

U.S. patent application Ser. No. 14/050,041, filed Oct. 9, 2013, by Bernal et al., and entitled "Video Based Method and System for Automated Side-by-Side Traffic Load Balancing";

U.S. patent application Ser. No. 14/017,360, filed Sep. 4, 2013, by Bernal et al. and entitled "Robust and Computationally Efficient Video-Based Object Tracking in Regularized Motion Environments";

U.S. Patent Application Publication No. 2014/0063263, published Mar. 6, 2014, by Bernal et al. and entitled "System and Method for Object Tracking and Timing Across Multiple Camera Views";

U.S. Patent Application Publication No. 2013/0278767, published Oct. 24, 2013, by Bernal et al., and entitled "Vehicle Counting Methods and Systems Utilizing Compressed Video Streams";

U.S. Patent Application Publication No. 2013/0106595, published May 2, 2013, by Loce et al., and entitled "Vehicle Reverse Detection Method and System via Video Acquisition and Processing";

U.S. Patent Application Publication No. 2013/0088600, published Apr. 11, 2013, by Wu et al., and entitled "Multi-Resolution Video Analysis and Key Feature Preserving Video Reduction Strategy for (Real-Time) Vehicle Tracking and Speed Enforcement Systems";

U.S. Patent Application Publication No. 2013/0076913, published Mar. 28, 2013, by Xu et al., and entitled "System and Method for Object Identification and Tracking";

U.S. Patent Application Publication No. 2013/0058523, published Mar. 7, 2013, by Wu et al., and entitled "Unsupervised Parameter Settings for Object Tracking Alorgithms";

U.S. Patent Application Publication No. 2009/0002489, published Jan. 1, 2009, by Yang et al., and entitled "Efficient Tracking Multiple Objects Through Occlusion";

Azari, M.; Seyfi, A.; Rezaie, A. H., "Real Time Multiple Object Tracking and Occlusion Reasoning Using Adaptive Kalman Filters", Machine Vision and Image Processing (MVIP), 2011, 7th Iranian, pages 1-5, Nov. 16-17, 2011;

Jiyan Pan; Bo Hu, "Robust Occlusion Handling in Object Tracking", Computer Vision and Pattern Recognition, 2007, CVPR '07, IEEE Conference, pages 1-8, Jun. 17-22, 2007;

Gwo-Cheng Chao; Shyh-Kang Jeng; Shung-Shing Lee, "An improved occlusion handling for appearance-based tracking", Image Processing (ICIP), 2011 18th IEEE International Conference, pages 465-468, Sep. 11-14, 2011;

Steven W. Smith, Ph.D., "Special Imaging Techniques", The Scientist and Engineer's Guide to Digital Signal Processing, chapter 25, pages 423-450, copyright 1997-2011 by California Technical Publishing;

"Kalman filter", Wikipedia, http://en.wikipedia.org/wiki/Kalman_filter, 26 pages, printed Mar. 7, 2014;

U. Castellani, S. Livatino, and R. Fisher, "Improving environment modelling by edge occlusion surface completion," International Symposium on 3D Data Processing Visualization and Transmission, 2002;

C. L. Zitnick and T. Kanade, "A cooperative algorithm for stereo matching and occlusion detection," Proc. IEEE Trans. Pattern Analysis and Machine Intelligence, volume 22, 2000;

D. L'evesque and F. Deschênes, "Detection of Occlusion Edges from the Derivatives of Weather Degraded Images," Proc. of the Second Canadian Conference on Computer and Robot Vision, pages 114-120, 2005;

J. Konrad and M. Ristivojevi. "Video segmentation and occlusion detection over multiple frames," IS&T/SPIE Symposium on Electronic Imaging, Image and Video Communications, 2003;

Jackson, B.; Bodor, R.; Papanikolopoulos, N., "Learning static occlusions from interactions with moving figures," Intelligent Robots and Systems, 2004. (IROS 2004). Proceedings. 2004 IEEE/RSJ International Conference, pages 963, 968 Vol. 1, 28 Sep.-2 Oct. 2004; and Miller, G.; Atev, S.; Papanikolopoulos, N., "Detecting static occlusion edges using foreground patterns," Control and Automation, 2009. MED '09. 17th Mediterranean Conference, pages 952, 957, 24-26 Jun. 2009, are incorporated herein by reference in their entirety.

BRIEF DESCRIPTION

In one embodiment of this disclosure, described is a computer-implemented method of automatically identifying pixels corresponding to an occlusion in an image of a scene captured with an image capturing device, where the occlusion obstructs a detection of an object being tracked within the scene, the method comprising, in whole or part: a) identifying one or more objects in motion within the scene from a sequence of image frames including digital representations of the scene; b) updating an accumulator array with a location of the identified one or more objects in motion within the plurality of image frames; c) repeating steps a) and b) for a collection of image frames including multiple sequences of image frames; and d) identifying pixels corresponding to an occlusion from the accumulator array relative to the identified one or more objects in motion where an area of the accumulator array not associated with object motion and along a trajectory of the identified one or more objects in motion is identified as an occlusion.

In another embodiment of this disclosure, described is an image processing system comprising: a controller configured to receive a digital image of a scene, the controller configured to execute instructions to perform a method of automatically locating pixels corresponding to an occlusion in a scene captured with an image capturing device, the method comprising: a) identifying one or more objects in motion within the scene from a sequence of image frames including digital representations of the scene; b) updating an accumulator array with a location of the identified one or more objects in motion within the plurality of image frames; c) repeating steps a) and b) for a collection of image frames including multiple sequences of image frames; and d) identifying pixels corresponding to an occlusion from the accumulator array relative to the identified one or more objects in motion where pixels in an area of the accumulator array not associated with object motion and along a trajectory of the identified one or more objects in motion are identified as corresponding to an occlusion.

In still another embodiment of this disclosure, described is a computer program product comprising: a non-transitory computer-usable data carrier storing instructions that, when executed by a computer, cause the computer to perform a method of automatically locating pixels corresponding to an occlusion in a scene captured with an image capturing device, the method comprising: a) identifying one or more objects in motion within the scene from a sequence of image frames including digital representations of the scene; b) updating an accumulator array with a location of the identified one or more objects in motion within the plurality of image frames; c) repeating steps a) and b) for a collection of image frames including multiple sequences of image frames, where each sequence of image frames includes at least one different object in motion relative to the other sequences of image frames; and d) identifying pixels corresponding to an occlusion from the accumulator array relative to the identified one or more objects in motion where pixels in an area of the accumulator array not associated with object motion and along a trajectory of the identified one or more objects in motion are identified as corresponding to an occlusion.

DETAILED DESCRIPTION

Figure 1:
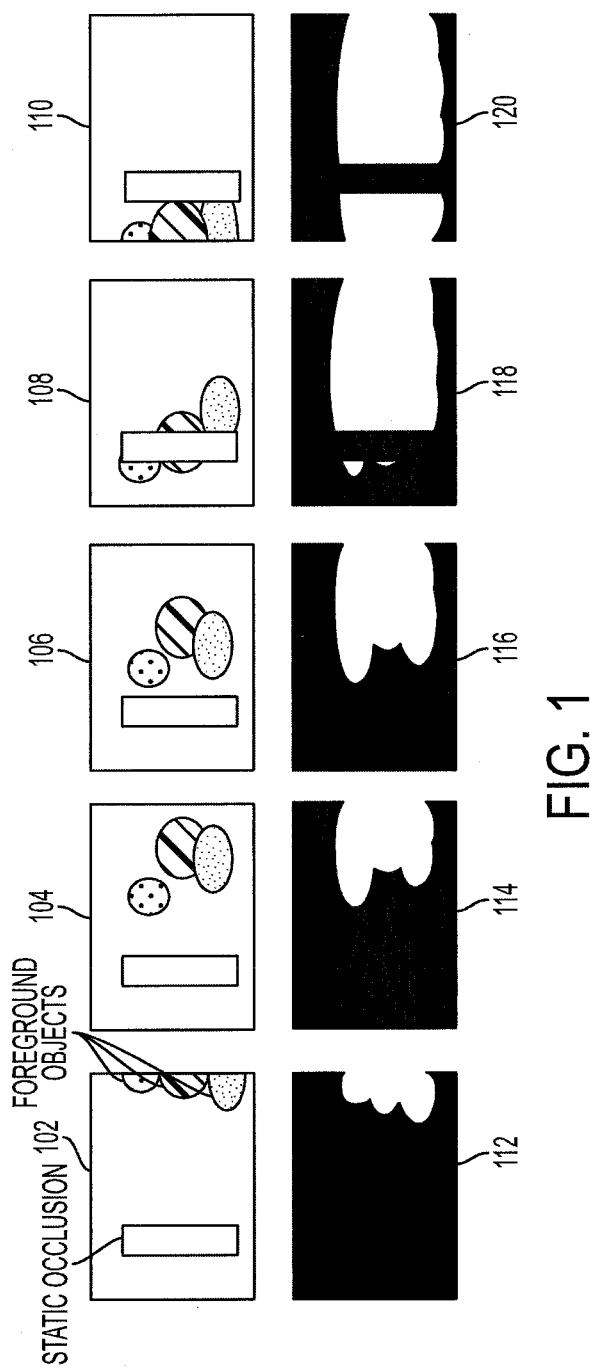
FIG. 1 is an illustration of an exemplary embodiment of a sequence of frames captured with an image capturing device (top row) and an associated static occlusion mask, i.e., thresholded accumulator array (bottom row).

This disclosure provides an algorithm(s) that locates pixels corresponding to static, i.e., permanent or semi-permanent, occlusions in an image of a scene. According to an exemplary method, pixels corresponding to static occlusions are automatically located by monitoring the motion of, or the foreground pixels corresponding to, single and/or multiple objects in a scene over time, where the algorithm performs the following steps: 1) Initializing a foreground accumulator array; 2) Segmenting/identifying foreground objects, from multiple image frames; 3) Updating an accumulator array with the identified foreground information; 4) Repeating the foreground identification and accumulation steps for a sequence/collection of image frames; 5) Creating a static occlusion mask from the accumulator array; and 6) Labeling pixels corresponding to static occlusions based on the occlusion mask. The disclosed exemplary embodiments provide relatively efficient and automated method(s) for the identification of pixels corresponding to static occlusions in video images. The disclosed approach(es) improves occlusion detection performance over previous methods.

The disclosed occlusion localization methods and systems improve traditional video-based object tracking methods which are usually susceptible to occlusions. The disclosed occlusion locating algorithm(s) provides an automated method for automatically determining the location of pixels corresponding to static occlusions in a scene. The located occlusion(s) information is subsequently used by an object tracking algorithm to achieve increased object tracking robustness.

The algorithm described in this disclosure locates static, i.e., permanent or semi-permanent, occlusions in a scene. If an object tracking algorithm has knowledge of a shape and pixel location of an occlusion(s), steps can be taken to mitigate the negative effects associated with the occlusion(s). The disclosed method and system automatically locate pixels associated with static occlusions by monitoring the motion of single or multiple objects in a scene over time. Steps associated with the disclosed occlusion location method include the following:

1) Initializing a foreground accumulator array; 2) Segmenting/identifying foreground objects, from multiple image frames; 3) Updating an accumulator array with identified foreground information; 4) Repeating the foreground identification and accumulation steps for a sequence/collection of image frames; 5) Creating a static occlusion mask from the accumulator array; and 6) Labeling pixels associated with static occlusions based on the occlusion mask.

While a method and system described herein can be applied generally to any method and/or system requiring or benefiting from occlusion location in a scene, this disclosure and the exemplary embodiments here apply occlusion location methods to systems including vehicle monitoring on roadways, in parking lots and drive-thru lanes where occlusions such as trees, signs, lampposts can often obstruct a camera view of a tracked object within some regions of the scene, causing failures and/or limitations in the tracking algorithms. Other potential static occlusions include blind spots in a camera (caused by e.g., faulty pixels in a camera sensor, a camera hood, glare from an external light source). Other applications include locating occlusions that hinder views of humans in surveillance and retail monitoring tasks.

Object tracking is a core technology that supports many algorithms used for surveillance and traffic monitoring. Typically, an object tracking algorithm includes the following steps:

1) Detecting a foreground object or an object in motion, for example, by producing a binary mask with blobs indicating the presence of the detected object. 2) Analyzing blobs to determine if they match the characteristics, e.g., size, shape, orientation, etc., of the object to be tracked. 3) For each blob that is determined to be of interest, extracting features from the image region indexed by the blob. 4) Extracting features in regions of interest neighboring the current location of the object in subsequent frames and finding regions of the image whose features best match the extracted features from the object, thus effectively re-locating the object in subsequent frames. Notably, this step can be relatively difficult depending on the complexity of the scene, as well as the tracked object itself. The foreground object detection in step 1 can be performed, for example, by maintaining an estimate of the background and by comparing each incoming frame with that estimate; pixels that are significantly different from the estimated background may be considered foreground pixels. Objects in motion can be detected in step 1 by performing frame differencing, where temporally consecutive frames are compared for significant differences among them. Pixels where large differences are found likely contain portions of the scene where motion is present between the frames in question. Other object detection algorithms can alternatively be applied, such as computer vision approaches that detect/localize objects of a particular nature, e.g., vehicles, pedestrians, in a still image or video frame via the application of a previously trained classifier.

An objective of this disclosure and the exemplary embodiments described herein, is to assist the last stage of the object tracking algorithm, i.e., to provide a method for increasing the robustness of object tracking algorithms, in general, by providing the locations of pixels within a frame where a camera's view of a tracked object is occluded by, in general, a static fixture in the scene. Improvements in object tracking accuracy can be gained through the use of a corresponding occlusion handling algorithm as described in U.S. Publication No. 2015/0310273, filed Apr. 25, 2014, by Matthew Shreve et al., and entitled "STATIC OCCLUSION HANDLING USING DIRECTIONAL PIXEL REPLICATION IN REGULARIZED MOTION ENVIRONMENTS".

Automatic static occlusion detection has been well studied for sensor modalities where depth information is readily available from measurements. See U. Castellani, S. Livatino, and R. Fisher. "Improving environment modelling by edge occlusion surface completion," International Symposium on 3D Data Processing Visualization and Transmission, 2002 and C. L. Zitnick and T. Kanade. "A cooperative algorithm for stereo matching and occlusion detection," Proc. IEEE Trans. Pattern Analysis and Machine Intelligence, volume 22, 2000. With these systems, it is straightforward to detect the occluding body based on depth information where objects in front of an object of interest are directly measurable. However, these sensor modalities can have limited use in real-world settings where only a single monocular camera sensor is available for a given region of interest. The method and system described herein provides a means for detecting pixels corresponding to static occlusions from a single camera view by monitoring a scene for a relatively extended period of time.

Some methods for detecting occlusions with the use of a single camera for input have been previously proposed and are now described.

D. L'evesque and F. Deschênes, "Detection of Occlusion Edges from the Derivatives of Weather Degraded Images," Proc. of the Second Canadian Conference on Computer and Robot Vision, pp. 114-120, 2005, which uses the amount of image degradation due to poor weather conditions as a feature to detect boundaries between objects at different depths. The degree of image degradation increases with distance which serves as a proxy for the depth discontinuities. One limitation of this method is that it only works on videos acquired under poor weather conditions, such as snow, rain, etc.

J. Konrad and M. Ristivojevi, "Video segmentation and occlusion detection over multiple frames," IS&T/SPIE Symposium on Electronic Imaging, Image and Video Communications, 2003, a spatiotemporal approach is proposed to perform occlusion analysis and characterization that is based on object tunnels in the image sequence domain, which is relatively computationally expensive, and does not apply well to natural scenes or occlusion bodies that do not have straight-line boundaries.

A passive shape-based system for detecting static scene occlusion edges from moving figures is proposed in Jackson, B.; Bodor, R.; Papanikolopoulos, N., "Learning static occlusions from interactions with moving figures," Intelligent Robots and Systems, 2004, (IROS 2004), Proceedings, 2004 IEEE/RSJ International Conference, pp. 963, 968 vol. 1, 28 Sep.-2 Oct. 2004. The approach here is relatively simple in terms of implementation and computational complexity. However, it assumes that the moving object rarely undergoes large/rapid changes in geometric area during the course of normal motion, which limits the application of this method dramatically.

Miller, G.; Atev, S.; Papanikolopoulos, N., "Detecting static occlusion edges using foreground patterns," Control and Automation, 2009. MED '09, 17th Mediterranean Conference, pp. 952, 957, 24-26 Jun. 2009, proposes a rule-based method for finding large, rigid occluders in a scene by identifying specific spatiotemporal patterns occurring in the binary foreground segmentation masks obtained from the input video. The method operates by defining a set of patterns and then a finite number of states that allow transitions from one pattern to another which identify left and right boundaries of occlusions. Although the method may provide satisfactory performance for some occluders, it fails to detect occlusion edges roughly parallel to the dominant direction of motion, which accounts for a significant number of cases.

Many other approaches, such as optical flow, appearance-based approaches, and probabilistic approaches, have been developed for image segmentation and detection of occlusion among several moving objects being tracked. See Azari, M.; Seyfi, A.; Rezaie, A. H., "Real Time Multiple Object Tracking and Occlusion Reasoning Using Adaptive Kalman Filters," Machine Vision and Image Processing (MVIP), 2011 7th Iranian, pp. 1, 5, 16-17 Nov. 2011; Gwo-Cheng Chao; Shyh-Kang Jeng; Shung-Shing Lee, "An improved occlusion handling for appearance-based tracking," Image Processing (ICIP), 2011 18th IEEE International Conference, pp. 465, 468, 11-14 Sep. 2011; and, Jiyan Pan; Bo Hu, "Robust Occlusion Handling in Object Tracking," Computer Vision and Pattern Recognition, 2007. CVPR '07. IEEE Conference, pp. 1, 8, 17-22 Jun. 2007.

This detailed description and exemplary embodiments which follow provide a relatively efficient and effective static occlusion location/detection method that processes video obtained via a single camera and does not impose any assumptions on the scene of interest associated with the single camera, such as weather conditions, shapes/sizes of the occluders, and/or speeds of the moving objects in the scene.

The algorithm operates by finding regions in a scene that have not been repeatedly detected to be a part of a foreground over a predetermined period of time or number of frames. FIG. 1 illustrates the general idea behind the approach, which includes steps shown in FIG. 2 and described below.

As shown in FIG. 1, a series of images 102, 104, 106, 108 and 110 of a scene are captured where a ROI associated with the captured images includes a static occlusion and foreground objects which are tracked, the static occlusion partially occluding the tracked objects in captured images 108 and 110. An accumulator array is incremented as is further described below. A threshold C is applied to the accumulator in order to determine regions that have not been detected as a foreground pixel at least C times; the location of identified pixels is indicated in the generated static occlusion mask. The static occlusion mask is shown in representations 112, 114, 116, 118 and 120, which correspond to images 102, 104, 106, 108 and 110 respectively.

Figure 2:
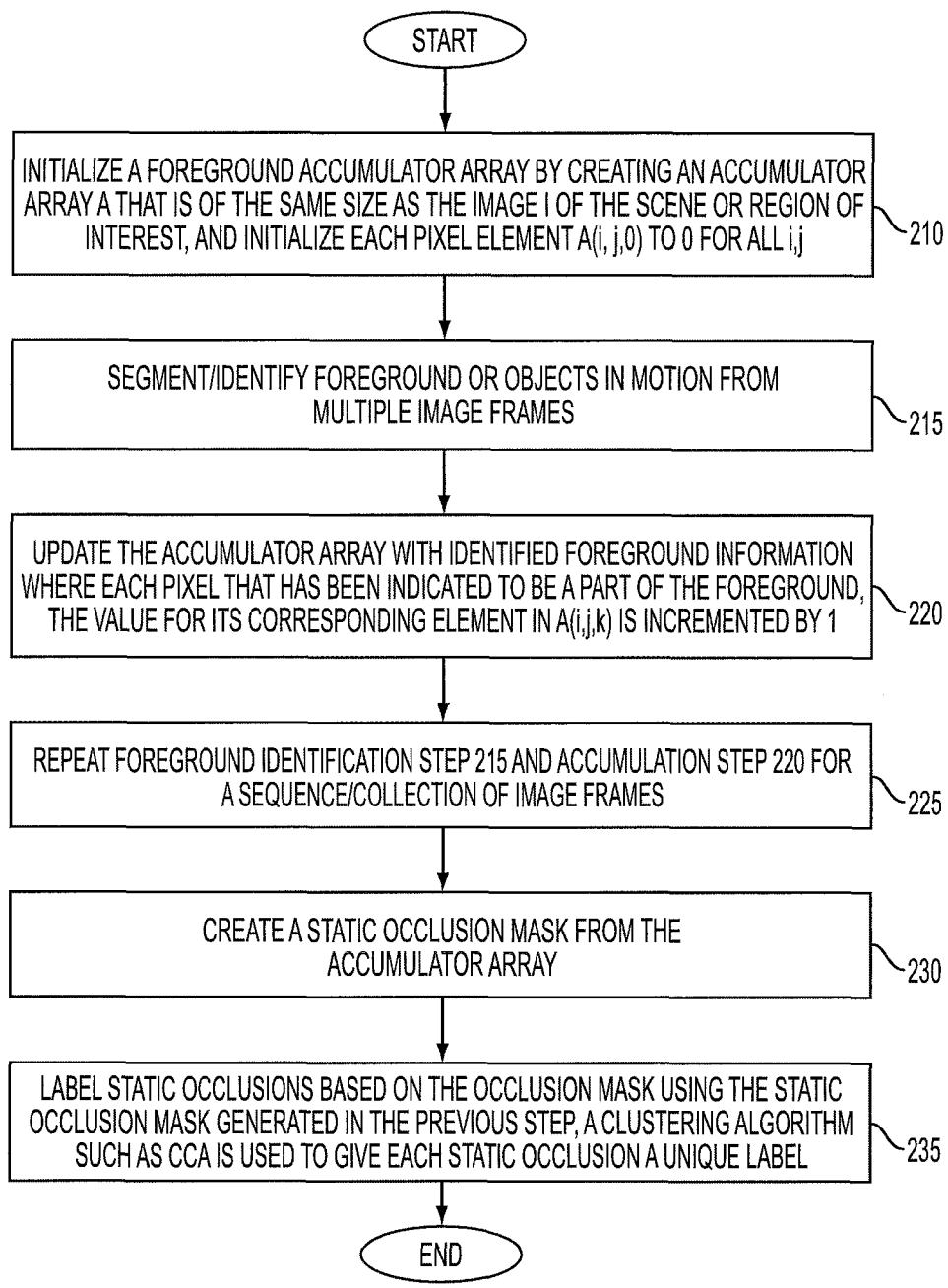
FIG. 2 is a flow chart of an exemplary method of locating/detecting pixels corresponding to occlusion(s) associated with a tracked object(s) according to an exemplary embodiment of this disclosure.

With reference to FIG. 2, the steps of an exemplary embodiment of a method of automatically identifying pixels corresponding to an occlusion are now described.

1) Initialize a foreground accumulator array by creating an accumulator array A that is of the same size as the image I of the scene or region of interest, and initialize each pixel element A(i,j) to 0 for all i,j 210.

2) Segment/identify foreground objects or objects in motion from multiple image frames. There are several known computer vision techniques that detect foreground objects in a scene from video 215. One approach that can be used creates a background model of the scene and then compares incoming frames or images of the same scene to find significant changes that usually correspond to foreground objects. Other known approaches use motion detection via frame differencing in order to find such changes. The input to this step is a new incoming frame, i.e., frame k, and possibly a number of previous frames, i.e., frames k−1, k−2, . . . , and/or future frames k+1, k+2, . . . , from the video sequence. A comparison is made between the current frame and past and/or future frames to generate an output binary matrix M or foreground mask that is of the same size as the image and that has 1 (0) values at foreground (background) pixel locations. It should be noted that alternative labeling and/or representations of the foreground mask can be used, as long as pixel values corresponding to the detected foreground object have a label that distinguishes it from the background.

3) Update the accumulator array with identified foreground information where each pixel that has been indicated to be a part of the foreground, the value for its corresponding element in $A(i,j)$ is incremented by 1 220. The inputs to this step include the matrix M or foreground mask from step 2, and the output is an updated accumulator array A.

4) Repeat foreground identification step 2 and accumulation step 3 for a sequence/collection of image frames 225. In other words, repeat the previous foreground identification and accumulation steps until N frames have been processed.

5) Create a static occlusion mask from the accumulator array 230. The created static occlusion mask is a new binary matrix $A_c$ that has the same height and width as image I and indicates whether each pixel of image I corresponds to a static occlusion (1) or not (0). In some applications it may be enough to merely detect/locate the non-occlusion areas shown in FIG. 6 without the need to specifically locate each static occlusion object. Otherwise, a static occlusion mask that indicates the location of pixels that have not been found to be a foreground pixel at least C times is further analyzed. Connected component analysis (CCA) is applied to the static occlusion mask on a row-by-row basis after the image axes have been adjusted to align with the general motion direction of the objects in the scene. Each object found with CCA is then accepted or removed from the static occlusion mask based on its height and width characteristics The input to this step is the accumulator array A, and the output of this step is a static occlusion mask $A_c$.

6) Label static occlusions based on the occlusion mask using the static occlusion mask generated in the previous step 5. A clustering algorithm such as CCA is used to give each static occlusion a unique label 235.

Figure 3:
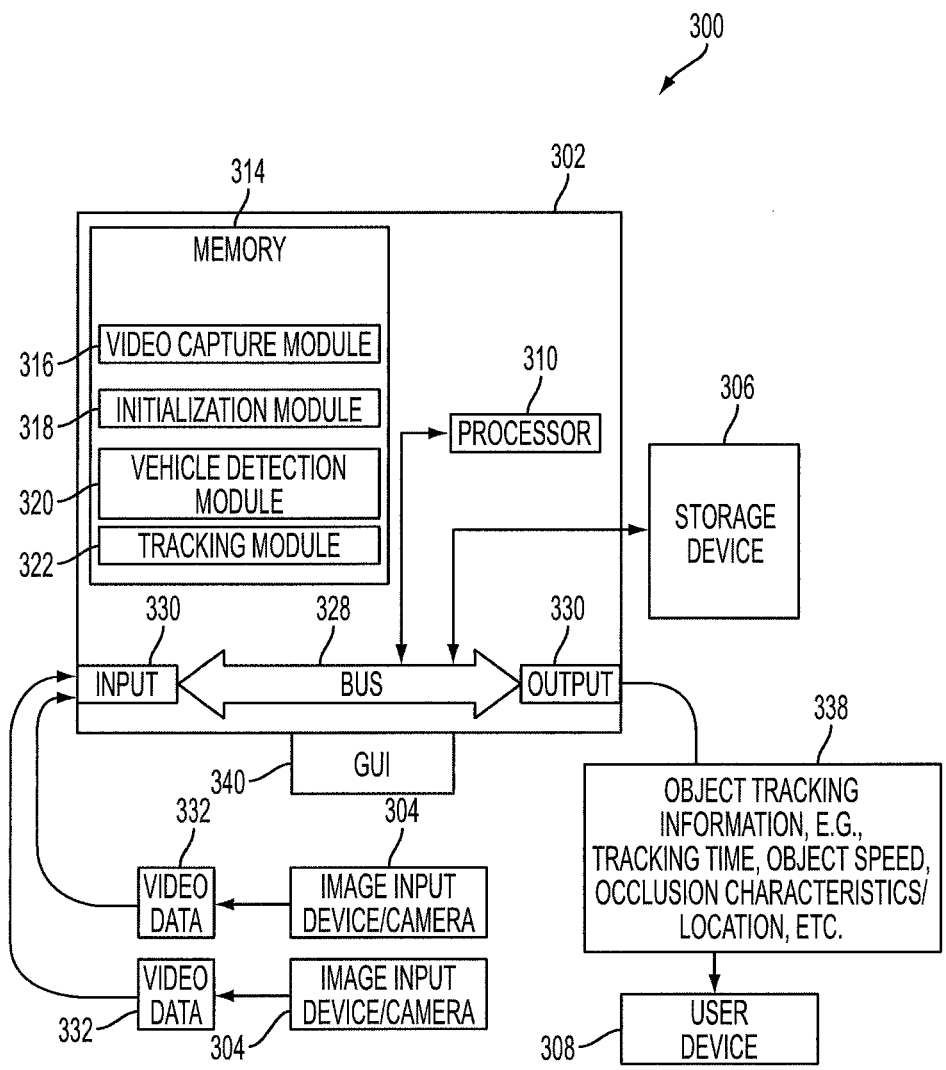
FIG. 3 is a schematical representation of an exemplary image capturing and processing system including an exemplary algorithm to locate/detect occlusion(s) associated with a tracked object(s) according to an exemplary embodiment of this disclosure.

With reference to FIG. 3, illustrated is a schematical representation of an exemplary image capturing and processing system including an exemplary algorithm to locate/detect pixels corresponding to occlusion(s) associated with a tracked object(s) according to an exemplary embodiment of this disclosure.

FIG. 3 is a schematic illustration of an image processing system 300 according to one exemplary embodiment, the system including an occlusion identification system as described herein. The system includes an image processing device 302, an image capture device 304, and a storage device 306, which may be linked together by communication links, referred to herein as a network. In one embodiment, the system 300 may be in further communication with a user device 308. These components are described in greater detail below.

The image processing device 302 illustrated in FIG. 3 includes a controller that is part of or associated with the image processing device 302. The exemplary controller is adapted for controlling an analysis of video data received by the system 300. The controller includes a processor 310, which controls the overall operation of the image processing device 302 by execution of processing instructions that are stored in memory 314 connected to the processor 310.

The memory 314 may represent any type of tangible computer readable medium such as random access memory (RAM), read only memory (ROM), magnetic disk or tape, optical disk, flash memory, or holographic memory. In one embodiment, the memory 314 comprises a combination of random access memory and read only memory. The digital processor 310 can be variously embodied, such as by a single-core processor, a dual-core processor (or more generally by a multiple-core processor), a digital processor and cooperating math coprocessor, a digital controller, or the like. The digital processor, in addition to controlling the operation of the image processing device 302, executes instructions stored in memory 314 for performing the parts of a method discussed herein. In some embodiments, the processor 310 and memory 314 may be combined in a single chip.

The image processing device 302 may be embodied in a networked device, such as the image capture device 304, although it is also contemplated that the image processing device 302 may be located elsewhere on a network to which the system 300 is connected, such as on a central server, a networked computer, or the like, or distributed throughout the network or otherwise accessible thereto. The video data analysis, i.e. object detection and occlusion identification, phases disclosed herein are performed by the processor 310 according to the instructions contained in the memory 314. In particular, the memory 314 stores a video capture module 316, which captures video data of a parking area of interest; an initialization module 318, which initializes the system; and an object detection module 320, which detects objects that are moving in the area of interest; an object tracking module 322, which tracks an object moving in the area of interest. Embodiments are contemplated wherein these instructions can be stored in a single module or as multiple modules embodied in the different devices.

The software modules as used herein, are intended to encompass any collection or set of instructions executable by the image processing device 302 or other digital system so as to configure the computer or other digital system to perform the task that is the intent of the software. The term "software" as used herein is intended to encompass such instructions stored in storage medium such as RAM, a hard disk, optical disk, or so forth, and is also intended to encompass so-called "firmware" that is software stored on a ROM or so forth. Such software may be organized in various ways, and may include software components organized as libraries, Internet-based programs stored on a remote server or so forth, source code, interpretive code, object code, directly executable code, and so forth. It is contemplated that the software may invoke system-level code or calls to other software residing on a server (not shown) or other location to perform certain functions. The various components of the image processing device 302 may be all connected by a bus 328.

With continued reference to FIG. 3, the image processing device 302 also includes one or more communication interfaces 330, such as network interfaces, for communicating with external devices. The communication interfaces 330 may include, for example, a modem, a router, a cable, and and/or Ethernet port, etc. The communication interfaces 330 are adapted to receive video and/or image data 332 as input.

The image processing device 302 may include one or more special purpose or general purpose computing devices, such as a server computer or digital front end (DFE), or any other computing device capable of executing instructions for performing the exemplary method.

FIG. 3 further illustrates the image processing device 302 connected to an image source 304 for inputting and/or receiving the video data and/or image data (hereinafter collectively referred to as "video data") in electronic format. The image source 304 may include an image capture device, such as a camera. The image source 304 can include one or more surveillance cameras that capture video data of the area of interest. For performing the method at night, without external sources of illumination, the cameras 304 can include near infrared (NIR) capabilities at the low-end portion of a near-infrared spectrum (700 nm-1000 nm).

In one embodiment, the image source 304 can be a device adapted to relay and/or transmit the video captured by the camera to the image processing device 302. For example, the image source 304 can include a scanner, a computer, or the like. In another embodiment, the video data 332 may be input from any suitable source, such as a workstation, a database, a memory storage device, such as a disk, or the like. The image source 304 is in communication with the controller containing the processor 310 and memories 314.

With continued reference to FIG. 3, the system 300 includes a storage device 306 that is part of or in communication with the image processing device 302. In a contemplated embodiment, the image processing device 302 can be in communication with a server (not shown) that includes a processing device and memory, such as storage device 306.

With continued reference to FIG. 3, the video data 332 undergoes processing by the image processing device 302 to output an identification 338 pixels corresponding to of one or more occlusions, or other information, to an operator in a suitable form on a graphic user interface (GUI) 340 or to a user device 308, such as a smart phone belonging to a driver in transit or to vehicle computer and/or GPS system, that is in communication with the image processing device 302. The GUI 340 can include a display, for displaying information, to users, and a user input device, such as a keyboard or touch or writable screen, for receiving instructions as input, and/or a cursor control device, such as a mouse, trackball, or the like, for communicating user input information and command selections to the processor 310.

Various aspects of the method and system of locating/detecting occlusions is now described in further detail.

1) Initialize a foreground accumulator array 210.

This step requires the initialization of the accumulator array A. All entries to this array are initialized to 0, and each entry is responsible for keeping track how many times its corresponding pixel for incoming images have been identified as a foreground pixel.

2) Segment/identify foreground or objects in motion from multiple image frames 215.

As previously described, this step is responsible for identifying foreground and moving objects in a sequence or collection of image. Identification can include identifying the associated pixels so that the shape and location of the foreground object becomes known. According to an exemplary embodiment, a Gaussian Mixture Model (GMM) for background estimation and subtraction is used. Also, double frame differencing achieves similar performance for motion detection. Notably, double frame differencing is capable of detecting a smaller range of rates of motion than background estimation and subtraction, so the applicability of double frame differencing in this context may depend on the expected speeds of motion of the objects near the occlusion areas. Other foreground segmentation algorithms that can be used include frame differencing with a different background model, forward differencing, and backward differencing. Motion estimation techniques such as optical flow, blockmatching, or template matching can also be used. The input to this step is a new frame from the video sequence, and the key output is a binary matrix M that is the same size as the image, the binary matrix M indicating if each pixel is a foreground pixel (e.g., 1) or a background pixel (e.g., 0).

3) Update accumulator array 220.

For each pixel that has been determined to be a part of the foreground, the value for its corresponding element in A is incremented by 1. The input to this step includes of the matrix M from step 3, and the output is accumulator array A.

4) Repeat foreground identification step 2 and accumulation step 3 for a sequence/collection of image frames 225.

Figure 5:
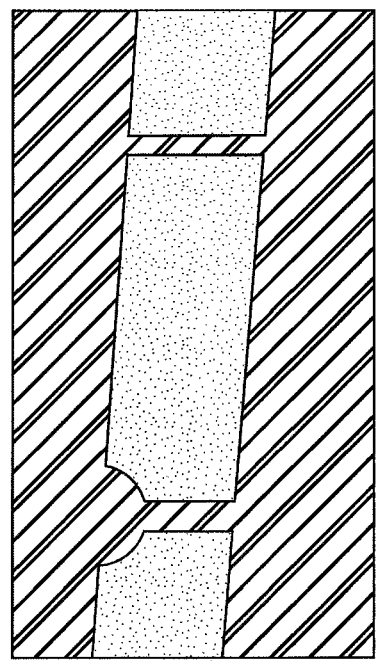
FIG. 5 is an example of an accumulator array generated for the original scene image shown in FIG. 2.

The prior two steps are repeated until n frames have been analyzed. As each frame is analyzed, the accumulator array is updated. A threshold (C) can be used to cap the largest number each entry can have, or alternatively, the raw values can be thresholded with C in the next step. FIG. 5 shows an example of an accumulator array after N frames.

5) Create Static Occlusion Mask from the accumulator array 230.

Figure 6:
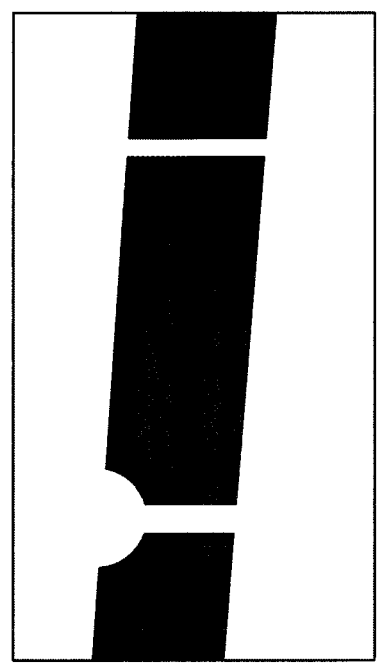
FIG. 6 is an example of a static occlusion mask generated from the accumulator array shown in FIG. 3.
Figure 4:
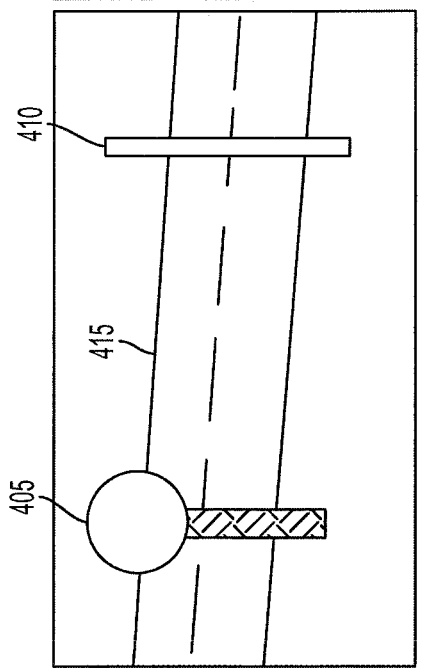
FIG. 4 is an example of an original scene frame captured with an image capturing device where two occluders, i.e., a tree and a pole, are present.

This step generates the mask to indicate which pixels are associated with static occlusions in the scene. Initially, the accumulator array A is checked for pixels with values smaller than a threshold C, indicating that the pixels did not contain a foreground object for a sufficient number of frames within N frames of interest. Hence, a new image is derived as, $$A_C(i, j, N) = \begin{cases} 1 & \text{if } A(i, j, N) < C \\ 0 & \text{otherwise} \end{cases},$$

where i, j are row and column indices in A. FIG. 6 shows an example image obtained for a predetermined C. Notably, the foreground objects, i.e., the pole 410 and bush 405 as shown in FIG. 4, are separated for a ranged of values for C. However, the exact boundary of the occlusion objects has been determined to be smoother and more accurate as C increases.

For some applications it may be enough to merely detect/locate pixels associated with the non-occlusion areas shown in FIG. 6 without the need to specifically locate each static occlusion object.

However, for other applications, locating pixels associated with each static occlusion may be required. Described now are 3 approaches for locating pixels in $A_c$ that are associated with static occlusions, where significant motion is not associated with those pixels.

(i) Vector-based Approach

The first step in this approach is to find a vector that describes a dominant direction of motion of objects traversing a scene, such as traffic moving from the right to left on the street shown in FIG. 4, using object tracking methods, motion estimation techniques such as optical flow, or manually using a priori knowledge of the scene, e.g., known lawful traffic flow directions for highway lanes or roads, where f=(u,v) is a vector describing a dominant direction and magnitude of the motion. Note that motion pattern(s) may be specific to a region of the image due to camera distortions in perspective. It is also possible to identify multiple dominant motion patterns in a scene such as vehicles moving in either direction, or pedestrians that follow a few different pathways. Each of these motion patterns can be represented as a normalized unit vector $f_1, f_2, f_3, \ldots f_n$, with each describing different possible motions of n foreground objects in the image.

Next, the following is done separately for each $f_i$, i=1 ... n:

Starting row by row of $A_c$ oriented in the $f_i$ direction, find lines or groups of lines from one side of the image to the other side of the image that consist of α 0-valued (non-static occlusion) pixels followed by a string of k 1-valued pixels (static occlusion pixels) and then back to another string of β 0-valued pixels. For example, a single line could be: '000000000011110000000000' or '00000000000011111111110'. If α<k<β, then the '1' locations in the image are copied to the final mask M and are indicated to be a part of a static occlusion. It is also possible to add an additional constraint to this step, where each group of '1's and the string of neighboring '0's must follow some defined ratio. More generally, the constraint may be that the number of along the entire length of the string must be less than some fraction of the total number of '0's.

Figure 7:
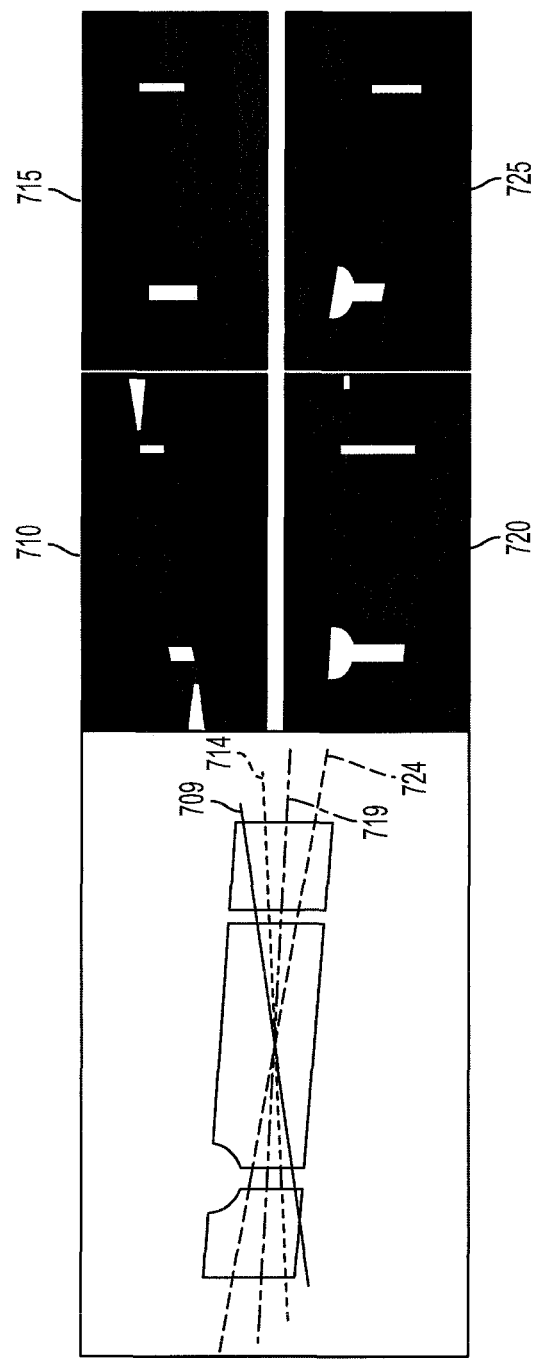
FIG. 7 is an illustration of a vector-based approach to a static occlusion detection algorithm according to an exemplary embodiment of this disclosure.

According to an exemplary embodiment, 3 lines are scanned simultaneously and the number of consecutive 8-connected '1's using connected component analysis is determined. Specific thresholds used may include T=15, α=10, β=500. Also, to reduce the complexity of tracing lines parallel to the normalized unit vector tan angle between $f_i$ and the image x-axis is determined and then the image x-axis is rotated by this angle. In other words, the orientation $$\Theta = \cos^{-1} \frac{f_i \cdot v}{|f_i| \cdot |v|^3}$$

if found where v is a unit vector aligned with the x-axis of the image plane. The results for several different orientations 709, 714, 719, and 724 as shown in FIG. 7, which correspond to occlusion masks 710, 715, 720 and 725. Note that it is also possible to combine several different orientations by doing logical operations on each image, such as 'or' or 'and', to create a more comprehensive static occlusion mask.

(ii) Geometry-based Approach

Figure 8:
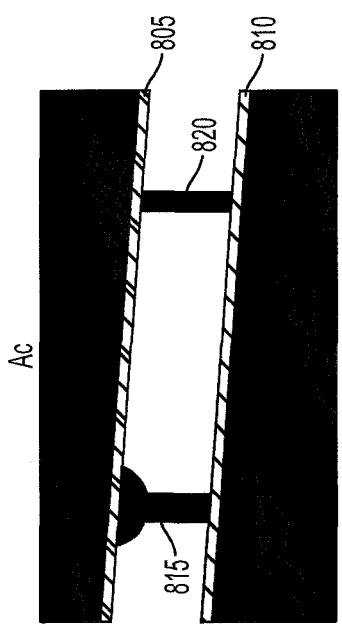
FIGS. 8 and 9 illustrate two lines detected using a Hough transform Ac, where the peaks of the image in FIG. 9 correspond to lines 805 and 810 in FIG. 8.

A second approach to finding pixels corresponding to static occlusions includes detecting geometric patterns in $A_c$. For instance, if the foreground objects are constrained to following only a few paths within a scene, such as cars on a road, then the foreground objects will likely create strong edges which form lines or curves along a boundary of each path as shown in FIGS. 8 (805 and 810) and FIGS. 9 (905 and 910). If lines are found, then the angle of line 8 can be determined and used in the previous approach as a vector/orientation which is further described below in approach iii. For a geometry-based approached, the geometry is directly used and the area between the two lines found in $A_c$ is analyzed to locate the static occlusions. The main benefit of this approach is that it does not rely on the computationally expensive step of frame-by-frame analysis of dominant motion pattern determination that is needed to track the trajectories of objects in the previously described vector-based approach. A potential drawback is that it relies on approximating a line or curve onto the boundaries, which may lead to spurious pixels being included in the static occlusion mask.

A well-known approach for detecting lines, or any shape in general, is a generalized Hough transform. The method works by parameterizing a shape of interest, and then voting based on a response of a pre-processed image, typically an edge map, at a range of parameters. As lines are detected, the method creates a parameter space including an angle φ, the angle of the vector from the origin, and a length ρ, the distance between the line and the origin.

The value at the index of the parameter space at (φ, ρ) is incremented when an edge pixel is found at x,y, for all x and y in $A_c$. Hence, large values, shown by the brighter regions in FIG. 9, correspond to values of $(\phi, \rho)$ that indicate where a line is found in $A_c$.

If two lines are found in $A_c$, then they may be considered as foreground object paths in the image if the distance between them is sufficient. In the example embodiment shown in FIG. 9 and FIG. 10, this includes calculating the average distance between each detected line. In order to simplify the process of calculating the average, the endpoints of each line are extended to the boundary of the image, and then the squared distance is calculated along both the x and y dimensions. If the average distance is greater than a predetermined threshold (minAveDist), then checking between these lines is not required. Otherwise, any regions in-between the lines that have a value of '1' (static occlusion pixels) are added to the final mask. According to an embodiment, a value of minAveDist=40 is used.

Figure 9:
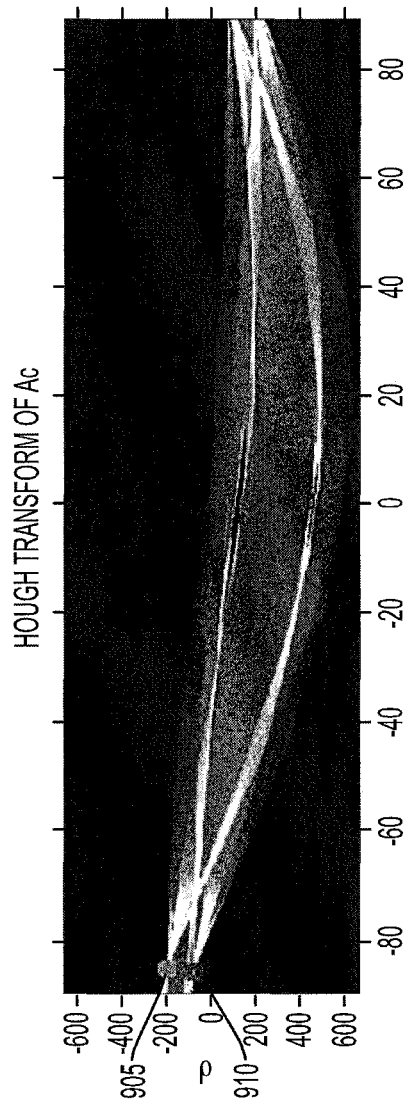

With reference to FIG. 8 and FIG. 9, the average distance calculated between line 810 and line 805 is roughly 74.6 pixels. Hence, the mask returned contains the static occlusions, shown in FIGS. 8 and 815 and 820.

(iii) Combined Geometry- and Vector-based approach

Instead of using the motion of foreground objects to define the orientation for a vector-based approach, it is also possible to use the lines detected by the Hough transform shown in FIG. 9. The main benefit of this approach is that, like the previous approach, it does not rely on computationally expensive dominant motion pattern determination while also taking advantage of the clean segmentation associated with the vector-based approach.

6) Label Static Occlusions 235.

After the mask is generated using one of the previous approaches (i-iii), '1' pixels in the static occlusion mask are grouped together using connected component analysis. Morphological operators such as opening, closing, erosion, dilation, or convex hull computation may be applied to the binary mask before labeling. In addition, the size of a connected component is restricted to be greater than a specified number of pixels, such as 50.

Notably, the exemplary embodiments of occlusion detection/location described herein are adaptable to multiple types and shapes of static occlusions and robust to different times of the day and environmental conditions; the method also works in a case where no prior knowledge of a scene is available and no assumptions are made such as speed(s) of motion, or motion patterns present in the scene.

Finally, it can be completely automated and does not require manual identification or localization of static occlusions; it can merely require a single setup phase; and the computational and spatial complexity is low since it only requires foreground pixel segmentation and an accumulator array.

Some portions of the detailed description herein are presented in terms of algorithms and symbolic representations of operations on data bits performed by conventional computer components, including a central processing unit (CPU), memory storage devices for the CPU, and connected display devices. These algorithmic descriptions and representations are the means used by those skilled in the data processing arts to most effectively convey the substance of their work to others skilled in the art. An algorithm is generally perceived as a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be understood, however, that all of these and similar terms are to be associated with the appropriate physical quantities and are merely convenient labels applied to these quantities. Unless specifically stated otherwise, as apparent from the discussion herein, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The exemplary embodiment also relates to an apparatus for performing the operations discussed herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general-purpose systems may be used with programs in accordance with the teachings herein, or it may prove convenient to construct more specialized apparatus to perform the methods described herein. The structure for a variety of these systems is apparent from the description above. In addition, the exemplary embodiment is not described with reference to any particular programming language. It will be appreciated that a variety of programming languages may be used to implement the teachings of the exemplary embodiment as described herein.

A machine-readable medium includes any mechanism for storing or transmitting information in a form readable by a machine (e.g., a computer). For instance, a machine-readable medium includes read only memory ("ROM"); random access memory ("RAM"); magnetic disk storage media; optical storage media; flash memory devices; and electrical, optical, acoustical or other form of propagated signals (e.g., carrier waves, infrared signals, digital signals, etc.), just to mention a few examples.

The methods illustrated throughout the specification, may be implemented in a computer program product that may be executed on a computer. The computer program product may comprise a non-transitory computer-readable recording medium on which a control program is recorded, such as a disk, hard drive, or the like. Common forms of non-transitory computer-readable media include, for example, floppy disks, flexible disks, hard disks, magnetic tape, or any other magnetic storage medium, CD-ROM, DVD, or any other optical medium, a RAM, a PROM, an EPROM, a FLASH-EPROM, or other memory chip or cartridge, or any other tangible medium from which a computer can read and use.

Alternatively, the method may be implemented in transitory media, such as a transmittable carrier wave in which the control program is embodied as a data signal using transmission media, such as acoustic or light waves, such as those generated during radio wave and infrared data communications, and the like.

It will be appreciated that variants of the above-disclosed and other features and functions, or alternatives thereof, may be combined into many other different systems or applications. Various presently unforeseen or unanticipated alternatives, modifications, variations or improvements therein may be subsequently made by those skilled in the art which are also intended to be encompassed by the following claims.

What is claimed is:

1. A computer-implemented method of automatically identifying pixels corresponding to an occlusion in a scene captured with an image capturing device, where the occlusion obstructs a view of an object, in whole or part, being tracked within the scene, the method comprising:
    a) identifying one or more foreground objects within the scene from at least one sequence of image frames including digital representations of the scene;
    b) updating an accumulator array at pixel locations of the identified one or more foreground objects within the plurality of image frames;
    c) determining a trajectory of the identified one or more foreground objects;
    d) detecting pixels in an area of the updated accumulator array not associated with the foreground objects and located along the trajectory; and
    e) associating the detected pixels as belonging to an occlusion.

2. The computer-implemented method of automatically identifying an occlusion according to claim 1, wherein prior to step a) the accumulator is initialized such that the accumulator array is equivalent in size to the image frames.

3. The computer-implemented method of automatically identifying an occlusion according to claim 1, wherein the accumulator array is a foreground or motion pixel accumulator array, wherein each index in the accumulator array corresponds to a pixel location and the value of the accumulator array at the given index is the number of times each pixel was observed to be a foreground or motion pixel.

4. The computer-implemented method of automatically identifying an occlusion according to claim 1, wherein the occlusion is static, and the image capturing device is a fixed single image capturing device.

5. The computer-implemented method of automatically identifying an occlusion according to claim 1, wherein the image capturing device is one of a video camera, infrared camera, thermal camera, and satellite imaging camera.

6. The computer-implemented method of automatically identifying an occlusion according to claim 1, wherein there are two or more occlusions identified in the scene.

7. The computer-implemented method of automatically identifying an occlusion according to claim 1, wherein the occlusion is one of a tree, bush, lamp post, sign, fixture, booth, vehicle, image capturing device, or a blind spot.

8. The computer-implemented method of automatically identifying an occlusion according to claim 1, wherein steps c) and d) include creating an occlusion mask from the accumulator array.

9. The computer-implemented method of automatically identifying an occlusion according to claim 8, wherein connected component analysis (CCA) is applied to the occlusion mask on a row-by-row basis after image axes have been adjusted to align with a general motion direction of the objects in the scene.

10. The computer-implemented method of automatically identifying an occlusion according to claim 8, wherein step c) includes determining a vector to represent a dominant direction of the identified objects in motion.

11. The computer-implemented method of automatically identifying an occlusion according to claim 8, wherein step d) includes detecting geometric patterns in the accumulator array to identify the pixels corresponding to the occlusion.

12. An image processing system for automatically locating pixels corresponding to an occlusion in a scene, the system comprising:
    a processor; and,
    a non-transitory computer readable memory storing instructions that are executable by the processor to:
    a) receive a digital image of a scene captured with an image capturing device:
    b) identify one or more foreground objects within the scene from at least one sequence of image frames including digital representations of the scene;
    c) update an accumulator array with a location of the identified one or more foreground objects within the plurality of image frames;
    d) determine a trajectory of the identified one or more foreground objects:
    e) detect pixels in an area of the updated accumulator array not associated with the foreground objects and located along the trajectory; and
    associate the detected pixels as belonging to an occlusion.

13. The image processing system according to claim 12, wherein prior to step b) the accumulator is initialized such that the accumulator array is equivalent in size to a size of the image frames.

14. The image processing system according to claim 12, wherein the accumulator array is a foreground pixel accumulator array, the identified one or more foreground objects are associated with foreground pixels of the image frames where foreground objects are identified, and the accumulator array is updated with foreground information.

15. The image processing system according to claim 12, wherein the occlusion is static, and the image capturing device is a fixed single image capturing device.

16. The image processing system according to claim 12, wherein the image capturing device is one of a video camera, infrared camera, thermal camera, and satellite imaging camera.

17. The image processing system according to claim 12, wherein there are two or more occlusions identified in the scene.

18. The image processing system according to claim 12, wherein the occlusion is one of a tree, bush, lamp post, sign, fixture, booth, vehicle, image capturing device blind spot, and a person.

19. The image processing system according to claim 12, wherein steps d) and e) include creating an occlusion mask from the accumulator array.

20. The image processing system according to claim 19, wherein connected component analysis (CCA) is applied to the occlusion mask on a row-by-row basis after image axes have been adjusted to align with a general motion direction of the objects in the scene.

21. The image processing system according to claim 19, wherein step d) includes determining a vector to represent a dominant direction of the identified objects in motion.

22. The image processing system according to claim 19, wherein step e) includes detecting geometric patterns in the accumulator array to identify the occlusion.

23. A computer program product comprising:
    a non-transitory computer-usable data carrier storing instructions that, when executed by a computer, cause the computer to perform a method of automatically locating an occlusion in a scene captured with an image capturing device, the method comprising:
a) identifying one or more foreground objects within the scene from at least one sequence of image frames including digital representations of the scene;
b) updating an accumulator array with a location of the identified one or more foreground objects within the plurality of image frames;
c) determining a trajectory of the identified one or more foreground objects; and
d) identifying pixels in an area of the accumulator array not associated with foreground objects and along the trajectory and associating the pixels as corresponding to an occlusion.

24. The computer program product according to claim 23, wherein prior to step a) the accumulator is initialized such that the accumulator array is equivalent in size to a size of the image frames.

25. The computer program product according to claim 23, wherein steps c) and d) include creating an occlusion mask from the accumulator array.

\* \* \* \* \*